Aug. 28, 1951     H. M. PFLAGER     2,565,519
RAILWAY TRUCK

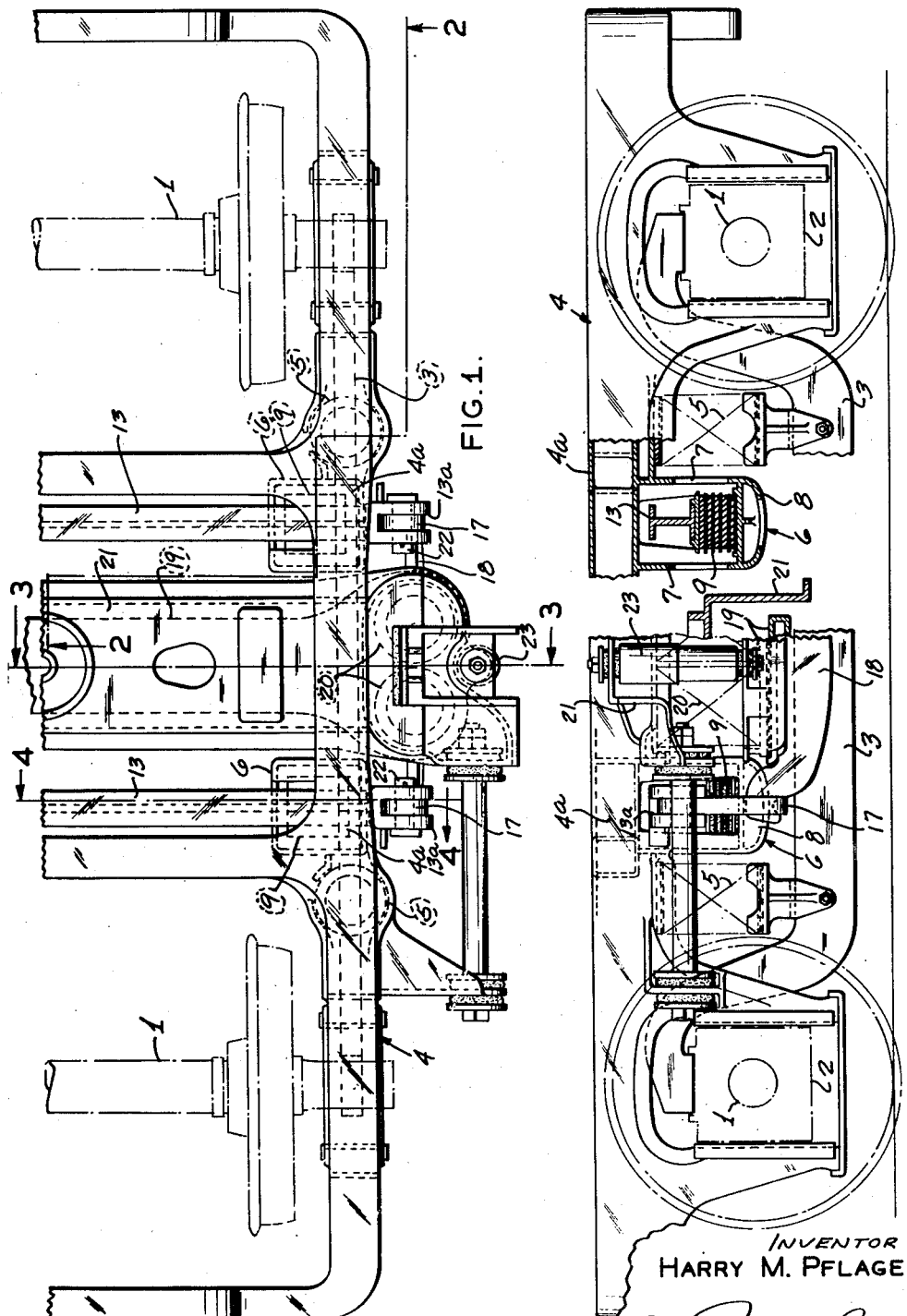

Filed July 19, 1946     2 Sheets-Sheet 2

INVENTOR
HARRY M. PFLAGER
By Rodney Bedell
ATTORNEY

Patented Aug. 28, 1951

2,565,519

UNITED STATES PATENT OFFICE 2,565,519

RAILWAY TRUCK

Harry M. Pflager, St. Louis, Mo., assignor to General Steel Castings Corporation, Granite City, Ill., a corporation of Delaware Application July 19, 1946, Serial No. 684,751

5 Claims. (Cl. 105—190)

The invention relates to railway rolling stock and consists in novel truck structure.

The ordinary truck is provided with swing hangers to take care of heavy lateral shocks, but minor shocks caused by hunting of the wheels on the rail or by track irregularities are not sufficient to move the swing hangers, and such shocks are transmitted from the truck through the truck bolster to the car body.

It is the object of this invention to absorb these minor lateral vibrations completely by means of yielding pads of rubber-like material supporting auxiliary bolsters from which the swing hangers and associated structure are suspended, thereby preventing such minor shocks from being transmitted to the swing hangers and associated structure and subsequently to the car body.

Another object of the invention is to improve the lateral motion action of a railway truck bolster supported from swing hangers by providing lateral movement between the frame and the pivoted supports for the swing hangers.

Another object of the invention is to provide greater stability in a truck having auxiliary bolsters than has been previously provided in such trucks.

These and other detail objects as will appear from the following description are attained by the structure illustrated in the accompanying drawings, in which:

Figure 1 is a top view of one longitudinal half of a railway truck constructed according to the invention.

Figure 2 is in part a side view and in part a vertical section taken approximately on line 2—2 of Figure 1.

Figure 3:
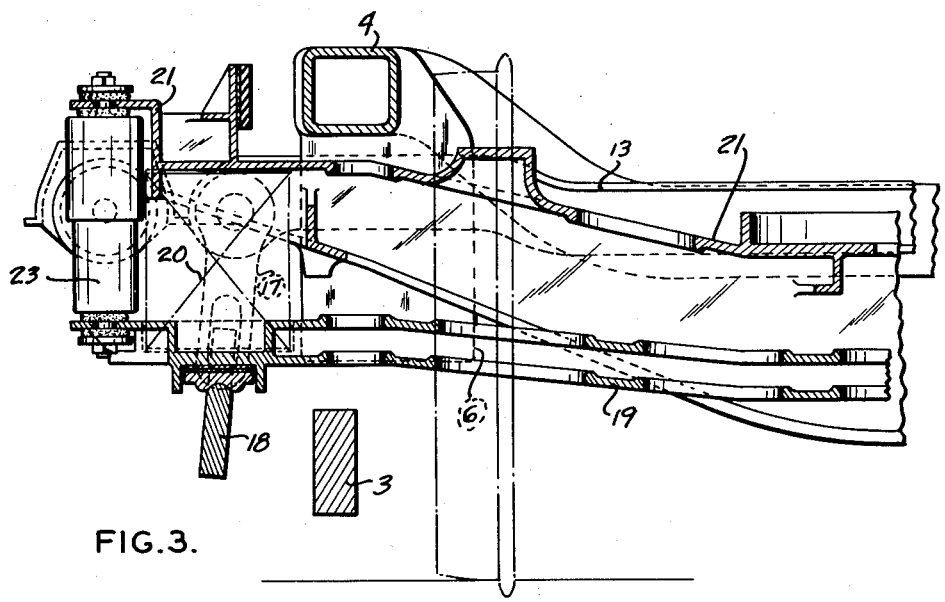
Figure 4:
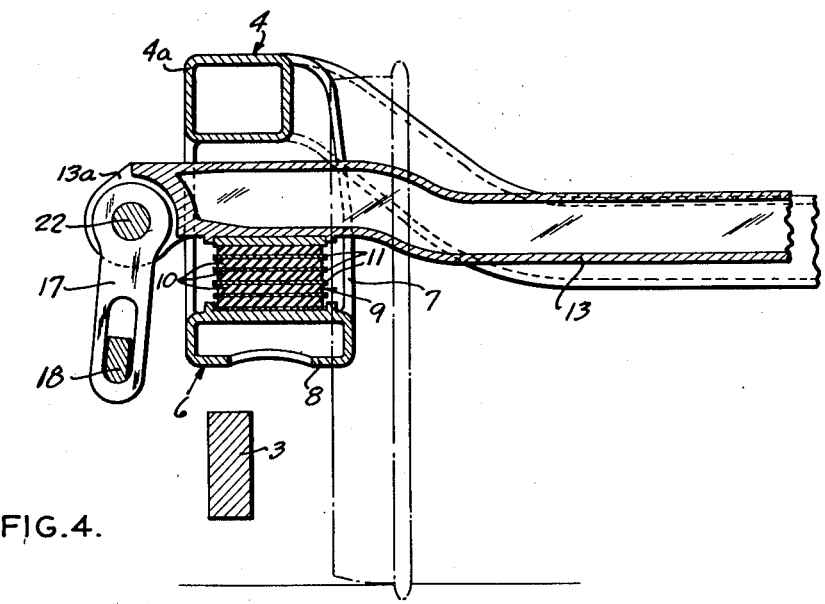

Figures 3 and 4 are transverse vertical sections taken approximately on lines 3—3 and 4—4, respectively, of Figure 1.

The truck includes a pair of wheeled axles f, journal boxes 2 and equalizers 3 mounted on the boxes and supporting a truck frame 4 by means of coiled springs 5. A pair of longitudinally spaced substantially U-shaped members 6 having substantially vertical portions 7 and horizontal portions 8 depend from truck frame 4 at each side thereof. A yielding pad 9, made of alternate layers of rubber 10 and steel 11 bonded together, is mounted on horizontal portion 8 of each U-shaped member 6. Auxiliary bolsters 13, in the form of I-beams, extend transversely of the truck and are mounted near their ends on pads 9.

Auxiliary bolsters 13 extend outwardly of the truck beneath and beyond wheel pieces 4a and outside swing hangers 17 are pivoted by pins 22 to the bifurcated ends 13a of auxiliary bolsters 13 and support cross bars 18 on which are mounted a spring plank 19 carrying coil springs 20 which support a bolster 21 on which the car body (not shown) is mounted. This arrangement provides also for spacing the springs apart a greater distance than on previous trucks without producing any additional bending moments on the spring plank, thus providing minimum weight and greater stability.

The resistance of pads 9 to a limited amount of distortion under shear preferably is less than the force required to overcome the friction between swing hangers 17 and their pins 22 and between cross bars 18 and hangers 17, as is necessary to cause pivotal movement of hangers 17.

A vertical shock absorber 23 is attached to each end of bolster 21 and spring plank 19 to damp vertical action of springs 20.

With this arrangement minor shocks caused by hunting of the wheels on the rail or by minor low spots in the track, not sufficient to move the swing hangers, are absorbed by yielding pads 9 before the shocks are transmitted to the swing hangers and associated structure supported thereby, thus improving the riding qualities of the car.

Yielding pads 9 distort to provide lateral movement between the frame and auxiliary bolsters in addition to the lateral movement of the swing hangers.

The wide spacing of swing hangers 17 and bolster springs 20 provide a truck of great lateral stability thereby reducing the roll of the car body.

Details of construction may be varied substantially without departing from the spirit of the invention and the exclusive use of novel structure as described as coming within the scope of the claims is contemplated.

What is claimed is:

1. In a railway truck, a truck frame, a pair of substantially U-shaped members at each side of the truck frame and spaced longitudinally of the truck, each of said members including substantially vertical portions having their ends rigid with the truck frame and having a substantially horizontal portion connecting said vertical portions and rigid therewith, a yielding pad mounted on the horizontal portion of each member, a pair of auxiliary bolsters extending transversely of the truck and mounted near their ends on said pads, a swing hanger mounted pivotally at each end of each of said auxiliary bolsters outside of said truck frame, cross-bars carried by pairs of said swing hangers, a spring plank mounted on said cross-bars and extending laterally of said truck, springs carried by said spring plank, and a bolster supported by said springs.

2. In a railway truck, a truck frame including wheel pieces and members spaced apart longitudinally of the truck frame at each side thereof and rigid therewith and depending therefrom, a pad yieldable laterally of the truck and mounted on each member below and aligned vertically with the associated wheel piece, auxiliary bolsters spaced apart longitudinally of the frame and extending transversely of the truck beneath and beyond the wheel pieces and mounted on said pads, swing hangers pivotally suspended from the auxiliary bolsters outwardly of the wheel pieces, a spring plank supported from the swing hangers, and a load-carrying bolster carried by said spring plank.

3. In a railway truck, a truck frame including wheel pieces and members spaced apart longitudinally of the truck frame at each side thereof and rigid therewith and depending therefrom, a pad yieldable laterally of the truck and mounted on each member below the level of the corresponding wheel piece, auxiliary bolsters spaced apart longitudinally of the frame and extending transversely of the truck beneath and beyond the wheel pieces and mounted on said pads, swing hangers suspended from pivots on the auxiliary bolsters and positioned outwardly of the wheel pieces, a spring plank supported from the swing hangers, and a load-carrying bolster carried by said spring plank.

4. In a railway truck, a truck frame including wheel pieces and members spaced apart longitudinally of the truck frame at each side thereof and rigid therewith and depending therefrom, a pad yieldable laterally of the truck and mounted on each member below and aligned vertically with the associated wheel piece, auxiliary bolsters spaced apart longitudinally of the frame and extending transversely of the truck beneath and beyond the wheel pieces and mounted on said pads, swing hangers pivotally suspended from the auxiliary bolsters outwardly of the wheel pieces, and a load-carrying bolster yieldingly supported from said swing hangers.

5. In a railway truck, a truck frame including wheel pieces and members spaced apart longitudinally of the truck frame at each side thereof and rigid therewith and depending therefrom, a pad yieldable laterally of the truck and mounted on each member below the level of the corresponding wheel piece, auxiliary bolsters spaced apart longitudinally of the frame and extending transversely of the truck beneath and beyond the wheel pieces and mounted on said pads, swing hangers pivotally suspended from the auxiliary bolsters outwardly of the wheel pieces, and a load-carrying bolster yieldingly supported from said swing hangers.

H. M. PFLAGER.

REFERENCES CITED

The following references are of record in the file of this patent:

UNITED STATES PATENTS

| Number | Name | Date |
| --- | --- | --- |
| 134,743 | Gardiner | Jan. 14, 1873 |
| 251,352 | Cosby | Dec. 27, 1881 |
| 2,051,647 | Oelkers | Aug. 18, 1936 |
| 2,097,277 | Hallquist | Oct. 26, 1937 |
| 2,127,934 | Pflager | Aug. 23, 1938 |
| 2,129,910 | Christianson et al. | Sept. 13, 1938 |

FOREIGN PATENTS

| Number | Country | Date |
| --- | --- | --- |
| 17,565 of 1914 | England | July 26, 1915 |